(12) United States Patent
Amanat et al.

(10) Patent No.: US 7,409,366 B1
(45) Date of Patent: Aug. 5, 2008

(54) APPARATUS AND METHOD FOR ADDING LIQUIDITY TO AN ECN AND IMPROVING EXECUTIONS OF ORDERS FOR SECURITIES

(75) Inventors: Omar Amanat, New York, NY (US); Michael Bundy, Katy, TX (US)

(73) Assignee: ETP Holdings, Inc., New York, NY (US)

(*) Notice: Subject to any disclaimer, the term of this patent is extended or adjusted under 35 U.S.C. 154(b) by 1572 days.

(21) Appl. No.: 09/643,227

(22) Filed: Aug. 22, 2000

(51) Int. Cl.
*G06Q 40/00* (2006.01)

(52) U.S. Cl. ............................. 705/37; 705/26; 705/27; 705/35; 705/36; 705/38; 705/39; 705/40

(58) Field of Classification Search ................. 705/26, 705/27, 35, 36, 37, 38, 39, 40, 49
See application file for complete search history.

(56) References Cited

U.S. PATENT DOCUMENTS

| | | | |
|---|---|---|---|
| 3,573,747 A | 4/1971 | Adams et al. | |
| 3,581,072 A | 5/1971 | Nymeyer | |
| 3,976,840 A | 8/1976 | Cleveland et al. | |
| 4,243,844 A | 1/1981 | Waldman | |
| 4,412,287 A | 10/1983 | Braddock, III | |
| RE31,643 E | 8/1984 | Waldman | |
| 4,585,130 A | 4/1986 | Brennan | |
| 4,588,192 A | 5/1986 | Laborde | |
| 4,674,044 A | 6/1987 | Kalmus et al. | |
| 4,677,552 A | 6/1987 | Sibley, Jr. | |
| 4,750,135 A | 6/1988 | Boilen | |
| 4,751,640 A | 6/1988 | Lucas et al. | |
| 4,903,201 A | 2/1990 | Wagner | |
| 4,949,248 A | 8/1990 | Caro | |
| 5,025,372 A | 6/1991 | Burton et al. | |
| 5,038,284 A | 8/1991 | Kramer | |

(Continued)

OTHER PUBLICATIONS

"A revolution in securities markets' structures?", Financial Market Trends (France), n65, pp. 15-37, Nov. 1996.*

(Continued)

*Primary Examiner*—Nga Nguyen
(74) *Attorney, Agent, or Firm*—Conley Rose, P.C.

(57) ABSTRACT

The invention provides methods and systems for improved execution of orders for securities and for adding liquidity to markets. Embodiments include receiving from customers orders for quantities of securities to be bought or sold, the orders optionally identifying pre-selected markets. Embodiments include sending orders to a first default market where orders are partially filled. Embodiments typically include sending orders to a pre-selected market, where orders are partially filled, and booking orders in a second default market. Embodiments include discounting fees charged to customers for orders booked into a default market. Booking IOC orders into a second default market typically includes setting the order time-in-force to a value other than zero. In many embodiments, the default markets are sometimes the same market, and sometimes they are different markets. Embodiments include selecting, from among a multiplicity of markets, the default markets dependent upon default market selection criteria. In many embodiments, market selection criteria include such factors as transaction costs or access fee levels for execution of orders in markets, response speed of markets (latency), and liquidity. In many embodiments at least one of the default markets is connected through tight coupling to a broker-dealer system.

43 Claims, 6 Drawing Sheets

U.S. PATENT DOCUMENTS

| | | | |
|---|---|---|---|
| 5,101,353 A | 3/1992 | Lupien et al. | |
| 5,136,501 A | 8/1992 | Silverman et al. | |
| 5,168,446 A | 12/1992 | Wiseman | |
| 5,267,148 A | 11/1993 | Kosaka et al. | |
| 5,270,922 A | 12/1993 | Higgins | |
| 5,297,031 A | 3/1994 | Gutterman et al. | |
| 5,297,032 A | 3/1994 | Trojan et al. | |
| 5,339,392 A | 8/1994 | Risberg et al. | |
| 5,361,199 A | 11/1994 | Shoquist et al. | |
| 5,375,055 A | 12/1994 | Togher et al. | |
| 5,500,889 A | 3/1996 | Baker et al. | |
| 5,508,913 A | 4/1996 | Yamamoto et al. | |
| 5,517,406 A | 5/1996 | Harris et al. | |
| 5,557,517 A | 9/1996 | Daughtery, III | |
| 5,563,783 A | 10/1996 | Stolfo et al. | |
| 5,640,569 A | 6/1997 | Miller et al. | |
| 5,655,088 A | 8/1997 | Midorikawa et al. | |
| 5,689,652 A | 11/1997 | Lupien et al. | |
| 5,727,165 A | 3/1998 | Ordish et al. | |
| 5,752,237 A | 5/1998 | Cherny | |
| 5,774,880 A | 6/1998 | Ginsberg | |
| 5,788,234 A | 8/1998 | Siofer | |
| 5,799,287 A | 8/1998 | Dembo | |
| 5,806,048 A | 9/1998 | Kiron et al. | |
| 5,809,483 A | 9/1998 | Broka et al. | |
| 5,819,237 A | 10/1998 | Garman | |
| 5,819,238 A | 10/1998 | Fernholz | |
| 5,845,266 A | 12/1998 | Lupien et al. | |
| 5,852,808 A | 12/1998 | Cherny | |
| 5,857,176 A | 1/1999 | Ginsberg | |
| 5,875,108 A | 2/1999 | Hoffberg et al. | |
| 5,901,246 A | 5/1999 | Hoffberg et al. | |
| 5,905,974 A | 5/1999 | Fraser et al. | |
| 5,924,083 A | 7/1999 | Silverman et al. | |
| 5,940,810 A | 8/1999 | Traub et al. | |
| 5,946,667 A | 8/1999 | Tull, Jr. et al. | |
| 5,950,176 A | 9/1999 | Keiser et al. | |
| 6,014,643 A * | 1/2000 | Minton | 705/37 |
| 6,247,000 B1 * | 6/2001 | Hawkins et al. | 705/37 |
| 6,278,982 B1 * | 8/2001 | Korhammer et al. | 705/37 |
| 6,377,940 B2 * | 4/2002 | Tilfors et al. | 705/37 |
| 6,408,282 B1 * | 6/2002 | Buist | 705/36 R |
| 6,421,653 B1 * | 7/2002 | May | 705/36 R |
| 6,629,082 B1 * | 9/2003 | Hambrecht et al. | 705/37 |
| 2002/0052827 A1 * | 5/2002 | Waelbroeck et al. | 705/37 |
| 2002/0069155 A1 * | 6/2002 | Nafeh et al. | 705/37 |
| 2002/0091611 A1 * | 7/2002 | Minton | 705/37 |
| 2003/0093360 A1 * | 5/2003 | May | 705/37 |
| 2003/0200167 A1 * | 10/2003 | Kemp et al. | 705/37 |
| 2003/0236738 A1 * | 12/2003 | Lange et al. | 705/37 |

OTHER PUBLICATIONS

"E*TRADE Canada raises The Bar For Online Brokerages By Announcing The 60 Second Advantage", Business Wire, Jan. 15, 2001.*

Chapman, "The Big Board's Express' Service", Traders, p. ITEM01016014, Jan. 1, 2001.*

Simon et al., "The Regulation of Specialists and Implication for the Future", Business Lawyer, v61, n1, pp. 217-387, Nov. 2005.*

* cited by examiner

APPARATUS AND METHOD FOR ADDING LIQUIDITY TO AN ECN AND IMPROVING EXECUTIONS OF ORDERS FOR SECURITIES

BACKGROUND

Until just a few years ago, securities were traded only through national and regional exchanges. From the customer's point of view, national exchanges were, and still are, difficult to access, expensive to use, and slow. For a long time, however, national and regional exchanges held an effective monopoly on securities trading. As eventually occurs for all monopolies, competition emerged. Independent electronic communications networks ("ECNs") rose to challenge the exclusive control of the exchanges. ECNs were successful, which encouraged formation of more ECNs. Now ECNs are capable of competing with national exchanges for large-scale trading services.

The lifeblood of ECNs, as for all markets, is liquidity. Market makers traditionally provide liquidity in the form of inventories of securities. ECNs typically are not market makers. The form of liquidity utilized by ECNs is bookings within the ECNs of actual orders for securities. ECNs only exist on the basis of liquidity. More specifically, any individual ECN that wishes to thrive must find ways of providing liquidity in the form of bookings of securities to market.

In prior art, ECNs competed with exchanges in terms of execution quality, especially speed and transaction cost. Now that there are many ECNs in the marketplace, many of whom provide execution speeds and transaction costs generally superior to that of the large exchanges, often it is true now that ECNs must compete with other ECNs for liquidity. In current art, total round-trip latency between broker-dealer systems and markets ranges from tens of milliseconds to hundreds of seconds, all in a trading environment where markets are often extremely volatile. In these markets, from the customer's point of view, any method of increasing execution speed is highly desirable. Methods and systems for improving order execution quality and methods and systems for generating liquidity for individual ECNs therefore are needed. Moreover, such improved methods and systems benefit the entire marketplace by generally improving both competition for liquidity and improved availability of liquidity.

If an online customer's order flow is directed to a market participant based on latent Level II Quotes, then the customer is at risk of chasing securities. In fact, chasing can occur in any trading situation in which there is substantial delay between changes in actual bookings in a market and the resulting change in a displayed quote. "Chasing" means repeatedly ordering a security at a price that is no longer available because of the delay between the change in the actual quote price or quantity and the display of the quote price or quantity, on the basis of which customers make decisions. An investor who "chases" securities is attempting to buy or sell securities at an order price or in quantities that in fact are no longer available in the market. Some other market participant or investor already bought or sold the securities at the displayed price, and the actual quote price or quantity has changed. The latency in updating quotes results in a display of prices or quantities that are no longer available. Chased orders typically remain unexecuted. It would be useful to have methods and systems for reducing the delay between the time when bookings actually change and the time when new prices or quantities are actually displayed to customers.

SUMMARY

The invention provides methods and systems for improved execution of orders for securities and for adding liquidity to markets. Embodiments include receiving from customers orders for a quantities of securities to be bought or sold, the orders optionally identifying pre-selected markets. Embodiments include sending orders to a first default market where orders are partially filled. Embodiments typically include sending orders to a pre-selected market, where orders again are partially filled, and booking orders in a second default market. Typical embodiments include returning status reports to customers at various stages of order execution.

Typical embodiments include charging fees to customers for execution of orders. Further embodiments include discounting fees charged to customers for orders booked into a second default market. Booking orders into a second default market typically includes setting the order time-in-force to a value other than zero. That is, such bookings typically are non-IOC orders. Orders booked to second default markets therefore will eventually either be partially filled, completely filled, or time out. When such orders are booked, and when such orders eventually fill or time out, embodiments utilizing such bookings will include receiving responses from the second default markets.

In many embodiments, the first default market and the second default market are the same market. In many embodiments, depending on how the default markets are selected, the default markets are sometimes the same market, and sometimes they are different markets.

Further embodiments include selecting, from among a multiplicity of markets, one or more default markets dependent upon default market selection criteria. In many embodiments, default market selection criteria include such factors as transaction costs or access fee levels for execution of orders in markets, response speed of markets (latency), and liquidity.

In many embodiments at least one of the default markets is connected through tight coupling to a broker-dealer system. Many markets provide market data feeds to broker-dealers and to customers, typically in the form of quotes. It is the delay between the changes in market information and the provision of the market information to broker-dealers and customers that is one of the causes of chasing. Tight coupling improves the speed of orders and responses, but also improves quote timing for quotes from tightly coupled markets. Tight coupling therefore reduces execution failures from chasing because, for tightly coupled markets, chasing occurs orders of magnitude faster than for non-tightly coupled markets. Market data from a tightly coupled default market, therefore, is much more likely to be current when the market is reached by an order based upon market data in a quote from such a market, and orders based upon such timely quotes are more likely to be filled in that market instead of being chased.

Typical embodiments of the invention send orders first to at least partially execute in a tightly coupled default market before sending the order for further execution to a pre-selected market. This method is used in typical embodiments even for orders whose pre-selected markets were chosen by a customer or a smart execution system. This method is a functional part of the invention because execution against available liquidity in a tightly coupled default market is far superior in terms of speed.

Tight coupling also means that the booking process for orders booked into tightly coupled default markets is far superior in terms of speed. Marketable orders booked because of lack of liquidity in other markets, therefore, are greatly speeded to their display of availability.

In embodiments where close coupling is achieved by installing and operating broker-dealer and ECN on the same computer system, substantial costs savings result from the need for less computer hardware and reduced system administrative overheads, including, for example, reduced data communications facilities, all of which cost reductions are generally available to benefit the entire market, broker-dealers, ECNs, market makers, and customers. It is a further aspect of many embodiments, especially for the purpose of improving liquidity in a particular default market, to automate discounts, credits, or other forms of payment or credit for orders adding liquidity by booking into a default market. In those instances when broker-dealers through use of the invention can execute or book orders in closely-coupled markets, those orders generally will be executed faster and cheaper than can be done in prior art.

DETAILED DESCRIPTION OF EXEMPLARY EMBODIMENTS

Definitions

"Book" or "Booking" refers to an order or sending an order to a market with the order's time-in-force set to a value other than zero, i.e., TIF greater than zero. TIF greater than zero denotes an order that is not an IOC order. Because non-IOC orders, orders with TIF greater than zero, typically are present in a market long enough to be displayed in quotes from the market, the orders are said to be "booked."

"Cancellation" is termination of an order, or partial termination of an order, by the customer or by software comprising an embodiment of the invention. In addition, markets can cancel orders, or parts of orders, for example, in response to an IOC order.

"Customer" refers to any person, trader, or investor, individual, company, or institution, using automated methods and systems for trading, buying or selling, securities.

"Default Market" indicates a market to be used for sending or booking orders regardless of the selection or pre-selection of other markets or when orders partially fill in other markets. In some embodiments, the functions are separated. That is, in some embodiments a first default market is used as a place to send orders regardless whether other markets are selected or pre-selected, and, in the same embodiments, a second default market is used to book orders partially filled in other markets. Orders may partially fill because they become unmarketable or because of a lack of sufficient liquidity in the other markets. In some embodiments, the first default market and the second default market are the same market. In other embodiments, a default market is used only for bookings of orders partially filled first in other markets. Bookings in default markets improve liquidity in those markets. Tightly coupling default markets according to the present invention yields strong improvements in quality of order execution.

"ECN" abbreviates "Electronic Communications Network," referring to an order matching service that provides liquidity by matching orders rather than by maintaining inventory. In the context of the invention, ECNs are considered markets. ECNs, like market makers are identified by use of market participant identification codes or "MPIDs." In order to avoid confusion with data communications networks, ECNs are referred to as either "ECNs" or as "markets." Some current ECNs, their symbols and names, are listed below. The number and identities of ECNs changes from time to time.

| Example List of ECNs | |
| --- | --- |
| MPID | Name |
| ARCA | Archipelago |
| BTRD | Bloomberg Trade Book |
| INCA | Instinet |
| ISLD | Island |
| MWSE | Midwest Stock Exchange |
| NTRD | NexTrade |
| REDI | Speer Leeds |

"Exchange" means a national, regional, or international exchange for securities trading including for example, Nasdaq or NYSE.

"Executed," in reference to an order, means that shares have been either bought or sold according to the side of the order.

"Filled" means executed. That is, shares in an order have been executed, bought or sold according to the side of the order. If an order is subject to partial fulfillment, then the order can be partly filled and partly rejected or cancelled. Processing of an order can therefore be completed through some combination of cancellation, rejection, or partial execution. Processing of an order is considered complete when all the shares in the order have been executed, cancelled, or rejected.

"Inside price" means, as appropriate, the highest bid price or the lowest ask price for a particular security. For buy orders, the inside price is the lowest ask price. For sell orders, the inside price is the highest bid price.

"IOC" abbreviates "Immediate or cancel," an order type description meaning that the market to which the order is directed is to fill the order immediately or cancel it.

"Interprocess communications" or "IPC" refers generally to data communications among separate computational processes each of which executes within its own computer address space. In some embodiments, the separate processes execute on separate computers. In other embodiments, the separate processes execute on the same computer. One example of IPC described below is shared memory segments. Other example methods of IPC useful with the invention include pipes, FIFOs (named pipes), message queues, and semaphores. Remote execution methods such as remote procedure calls and uses of CORBA-style object request brokers also are used in some embodiments to pass data among programs or processes operating on the same or separate computers. These methods of IPC, and others as well, are all within the scope of the invention.

"Latency" means a measure of the speed with which markets respond to orders and cancellations. Latency in many embodiments of the invention is determined as the difference between the time when a response to an order is received and the time when the corresponding order was sent to the market. Latency generally is measured from normal orders, test orders, or test messages. Some markets support test orders or test messages as such. For markets in which test orders or test messages are not supported, tests often are implemented by use of unmarketable orders immediately followed by cancellations. For markets receiving orders regularly, latency typically is tracked from normal orders, without the need for test orders. Latency is embodied as a single ratio difference between two recorded times or as various kinds of averages.

"Level Two Quotes" are quotes that comprise one or more market participant quotes ("MPQs"). The best known source of level two quotes is Nasdaq, but "level two quotes" refers to any form of market information that aggregates market participant quotes for a security.

"Marketable" means limit orders for which the inside price is equal to or better than the order price. That is, Marketable buy orders have order prices equal to or higher than the inside ask price. Marketable sell orders have order prices equal to or lower than the inside bid price. It is helpful to note that the concept of marketability is generally most useful regarding limit orders. That is, market orders as such are inherently marketable, because market orders have no limiting price against which the inside price can be meaningfully compared.

"Market," "electronic market," "market participant," "electronic market participant," "marketing network," and electronic marketing network" are all used as synonyms for services accessible through electronic communications networks capable of executing orders for securities by accepting from broker-dealers buy orders and sell orders, matching or failing to match buy orders with sell orders, and communicating the results to the broker-dealers. Generally the term "market" is used to refer to these entities. All "markets," as the term is used, are either ECNs or market makers. All available markets have names and symbols as described under the definitions of "ECN" and "market maker."

"Market maker" means a broker-dealer providing order matching and liquidity in a security by maintaining an inventory of the security. Market makers typically trade their inventories through exchanges. Some currently active market makers, their symbols and names, are listed below. The number and identity of market makers can change from time to time.

Example List of Market Makers

| MPID | Name |
| --- | --- |
| BEST | Bear, Stearns & Co., Inc. |
| BTAB | Alex, Brown & Sons, Inc. |
| GSCO | Goldman, Sachs & Co. |
| HMQT | Hambrecht & Quist, LLC |
| HRZG | Herzog, Heine, Geduld, Inc. |
| JANY | Janney Montgomery Scott, Inc. |
| LEHM | Lehman Brothers, Inc. |
| MADF | Bernard L. Madoff |
| MLCO | Merrill Lynch, Pierce, Fenner & Smith Inc. |
| MOKE | Morgan, Keehan & Co., Inc. |
| MONT | Nationsbanc Montgomery Securities, LLC |
| MSCO | Morgan Stanley & Co., Inc. |
| NITE | Knight Securities, L.P. |
| OLDE | Olde Discount Corporation |
| OPCO | CIBC Oppenheimer Corporation |
| PIPR | Piper Jaffray Inc. |
| PRUS | Prudential Securities, Inc. |
| PWJC | Paine Webber, Inc. |
| RAJA | Raymond James & Associates, Inc. |
| SBSH | Smith Barney, Inc. |
| SHRP | Sharpe Capital, Inc. |
| SHWD | Sherwood Securities Corporation |

"MPID" means Market Participant Identifier, a code used to identify all markets, ECNs, and market makers.

"Orders" are orders for purchase or sale of securities. In many of the embodiments described, "orders" are electronic orders for purchase or sale of securities.

"Quotes" are aggregates of information regarding securities traded in markets. Quotes include for securities listed for sale or purchase, symbols identifying the securities, price, side, quantities, and market identifications or MPIDs. Quotes can come from exchanges or directly from markets. A "Nasdaq Level Two Quote" includes market information in the form of market participant quotes for all markets offering to buy or sell a particular security through Nasdaq.

"Securities" are any agreement for investment. Stocks are the securities most often administered in described embodiments of the invention. The invention, however, is applicable to many kinds of securities including, for example, options, commodities, and bonds.

"Side" refers to which side of the market is represented by an order or a quote. Side indicates whether the quote or order is to buy or sell, bid or ask. "Bid" indicates the buy side. "Ask" indicates the sell side.

"Tight Coupling" means high speed data communications between broker-dealer systems and market systems. In the prior art, total round-trip latency between broker-dealer systems and markets ranged from tens of milliseconds to hundreds of seconds. Tight coupling denotes data communications between broker-dealer systems and market systems at least an order of magnitude faster than was typical in prior art. More specifically, for example, embodiments of the present invention utilizing shared memory segments and semaphores to effect interprocess communications among broker-dealer systems sharing random access memory with one or more market systems will typically demonstrate round-trip latencies of less than one microsecond, a latency improvement in these kinds of embodiments of at least three orders of magnitude over the prior art. Other forms of tight coupling will demonstrate various levels of improvement, but all forms of tight coupling represent improvements in execution quality.

DETAILED DESCRIPTION

Figure 1:
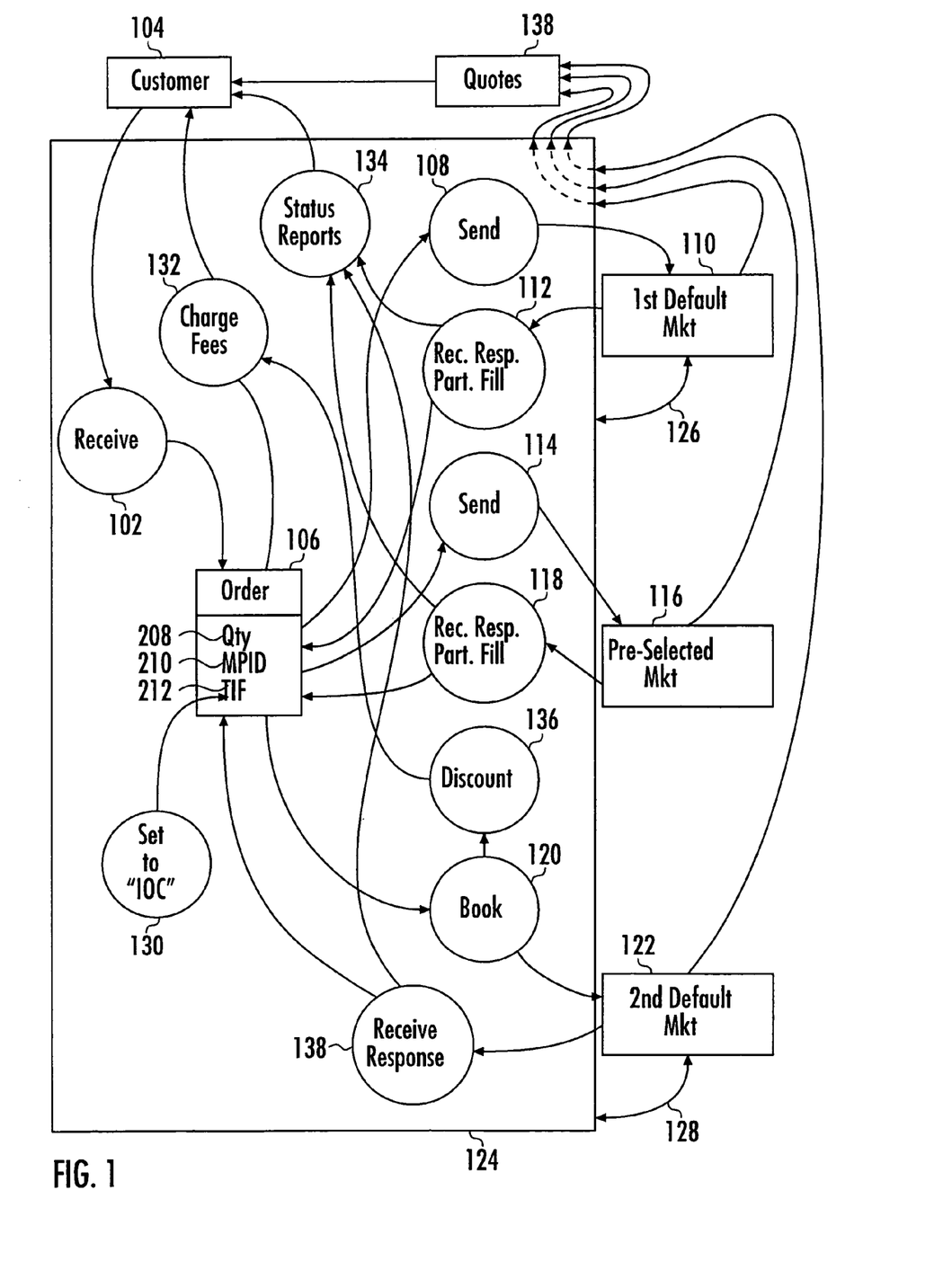
FIG. 1 is an overview flow diagram of typical embodiments.

Turning to FIG. 1, a first aspect of the invention is seen. A first embodiment illustrated in FIG. 1 provides a method of executing orders for securities in an automated broker-dealer system (124). This illustrated embodiment includes receiving (102) from a customer (104) an order (106) for a quantity (208) of securities to be bought or sold, the order having an MPID (210) optionally identifying a pre-selected market (116). The illustrated embodiment includes sending (108) the order (106) to a first default market (110), where the order is partially filled (112). The embodiment includes sending (114) the order (106) to a pre-selected market (116), where the order is partially filled (118), and booking (120) the order (106) in a second default market (122).

Typical embodiments include returning status reports (134) to customers (104) at various stages of order execution (112, 118, 138). Typical embodiments include charging fees (132) to customers (104) for execution of orders. A further embodiment shown in FIG. 1 includes discounting (136) fees charged (132) to customers (104) for orders booked (120) into a second default market (122).

Booking (120) orders (106) into a second default market typically includes setting the order TIF (212) to a value other than zero, that is, such bookings typically are non-IOC orders. Orders booked to second default markets therefore will eventually either be partially filled, completely filled, or time out. When such orders are booked, and when such orders eventually fill or time out, embodiments utilizing such bookings will include receiving responses (132) from the second default markets (122).

In a further embodiment, order (106) includes a time-in-force (212), as shown in FIG. 1. This kind of embodiment typically includes also setting (130) the time-in-force (212) to "IOC" before sending (114) the order to the at least one pre-selected market (116).

Figure 2:
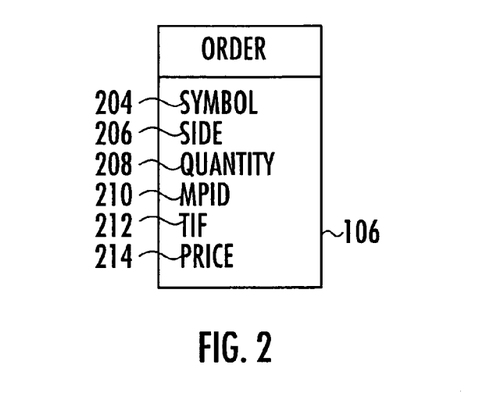
FIG. 2 is an example data structure for orders.

A data structure for orders, useful in many embodiments of the invention is shown in FIG. 2. In typical embodiments, as shown in FIG. 2, an order (106) includes a symbol (204) identifying securities to be bought or sold, a side (206) indicating whether the securities are to be bought or sold, and a quantity (208) of securities to be bought or sold according to the side. Orders in such embodiments typically include also an MPID (210) optionally set to a market identifier, a time-in-force (212) optionally set to a value greater than zero, and a price (214) optionally set to a value greater than zero.

In other embodiments, the first default market (110) and the second default market (122), shown on FIG. 1, are the same market. In many embodiments, depending on how the default markets are selected, the default markets are sometimes the same market and sometimes different markets.

Figure 3:
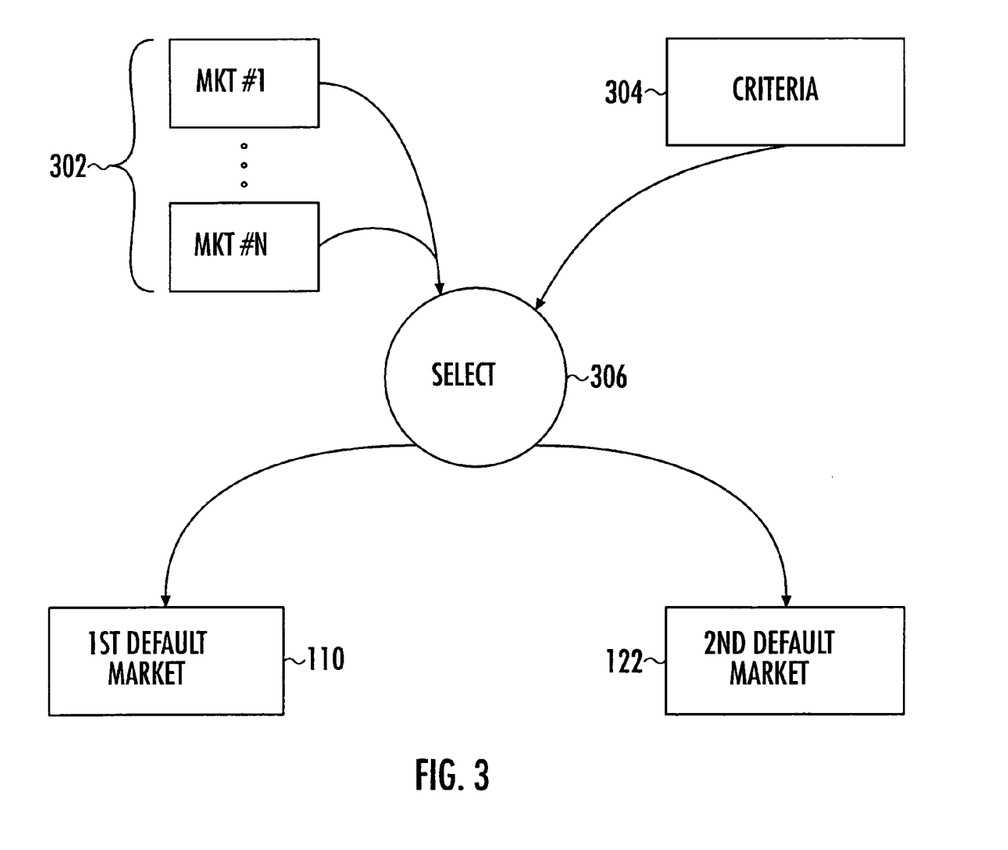
FIG. 3 illustrates selecting default markets by use of market selection criteria.

Turning to FIG. 3, a further embodiment is seen to include selecting (306), from among a multiplicity (302) of markets, the default markets (110, 122) dependent upon default market selection criteria (304). In many embodiments, market selection criteria include such factors as (1) transaction costs or access fee levels for execution of orders in markets, (2) response speed of markets, often referred to as 'latency,' the time typically elapsing between sending an order to a market and receiving a response from that market, and (3) liquidity, whether securities generally are available in a market. Various embodiments use alternative default market selection criteria, all of which are well within the scope of the invention.

Figure 4:
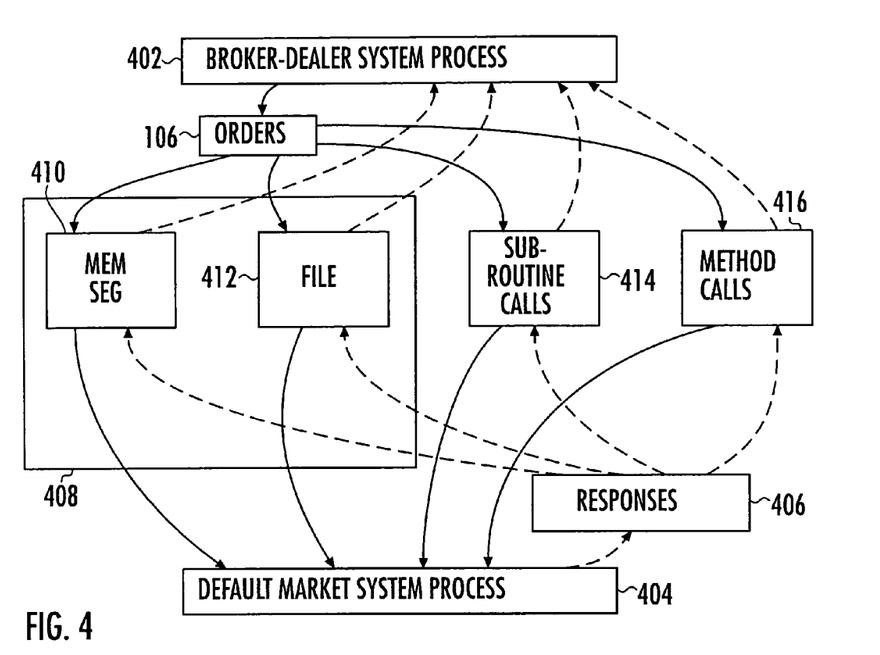
FIG. 4 illustrates aspects of close coupling.

In still further embodiments at least one of the default markets (110, 122) is connected through tight coupling (126, 128) to the broker-dealer system (124), as shown in FIG. 1. Alternative examples of tight coupling useful with the invention are shown in FIG. 4. All methods of tight coupling are well within the scope of the present invention.

In typical embodiments, shown in FIG. 4, tight coupling includes the capability of interprocess communications of orders (106) and responses (406) to orders through shared memory (408). Forms of shared memory include shared memory segments (410) accessed directly by processes (402, 404) running on a processor, shared files (412) on disk drives or other non-volatile memory, memory configured to emulate a disk drive while operating faster than physical disk drives, or other forms of shared memory. All forms of shared memory are well within the invention. All forms of interprocess communications of orders and responses are well within the invention.

Still further embodiments of tight coupling, as shown on FIG. 4, include the capability of communications of orders (106) and responses (406) to orders as parameters in subroutine calls (414). Similarly, the data communications aspects of the invention in some embodiments are implemented using high speed communications middleware object request brokers developed under the Common Object Request Broker Architecture or "CORBA," the standard for interoperability developed by the nonprofit organization known as the Object Management Group of Framingham, Mass. Some embodiments of tight coupling are implemented by use of remote procedure calls across high speed lines, when communicating across computers, or among processes running on either the same processor or processes running on separate processors on the same computer. CORBA calls also are implemented in some embodiments across high speed lines, when communicating across computers, or among processes running on either the same processor or processes running on separate processors on the same computer.

Also in FIG. 4, still further embodiments are illustrated in which tight coupling includes the capability of communications of orders (106) and responses (406) to orders as parameters in calls to class object interface member methods (416). Tight coupling, in embodiments using data communications to send and receive orders and responses between separate broker-dealer systems and market systems, typically includes the capability of communications through directly-connected or networked, dedicated or multipurpose, synchronous or asynchronous, parallel or serial, extremely high speed data communications ports and data communications lines.

Figure 5:
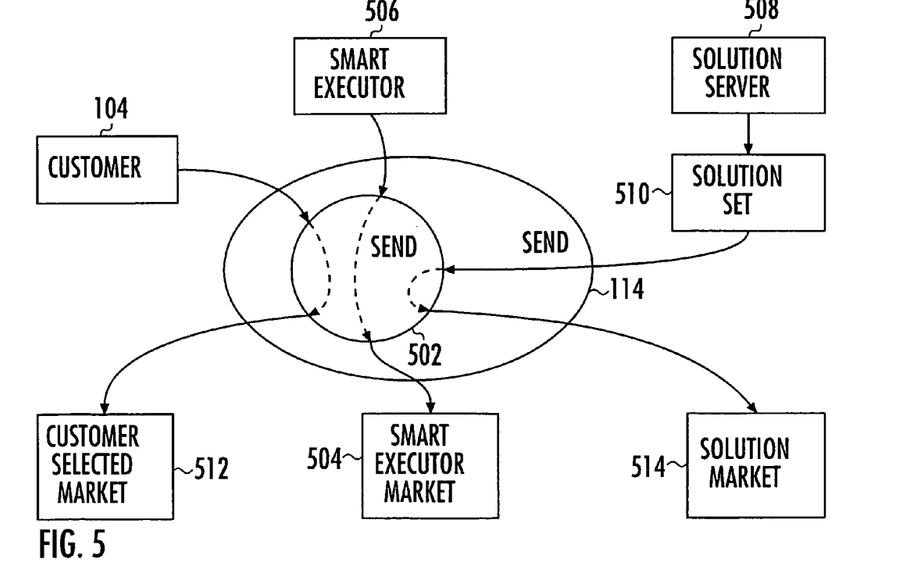
FIG. 5 illustrates sending orders to pre-selected markets.

In an alternative embodiment shown in FIG. 5, sending (114) the order to at least one pre-selected market further includes sending (502) the order to a market (512) identified in the MPID. In embodiments of this kind, the market identified in the MPID often is selected by the customer (104) before the order is received in the broker-dealer system.

In an alternative embodiment also shown in FIG. 5, sending (114) the order to at least one pre-selected market further includes sending (502) the order to a market (504) selected by a smart executor (506). A "smart executor" is a system of computer hardware and software designed and implemented for automated selection of markets for order for securities. An example description of a smart executor useful with the present invention is set forth in Appendix I. The use of any smart executor to select a market for use as a pre-selected market is well within the present invention.

In an alternative embodiment also shown in FIG. 5, sending (114) the order to at least one pre-selected market further includes sending (502) the order to a market (514) selected dependent upon a solution set (510) from a solution server (508). "Solution server" refers to automated systems of computer hardware and software capable of generating problem definitions for problems whose solutions depend upon environmental information, receiving the environmental information needed to generate solutions, generating solutions, and communicating the solutions to clients or customers. Solution servers useful with the present invention are any solution servers capable of advance solution of problems of securities trading. An example description of a solution server useful with the present invention is set forth in Appendix II.

Figure 6:
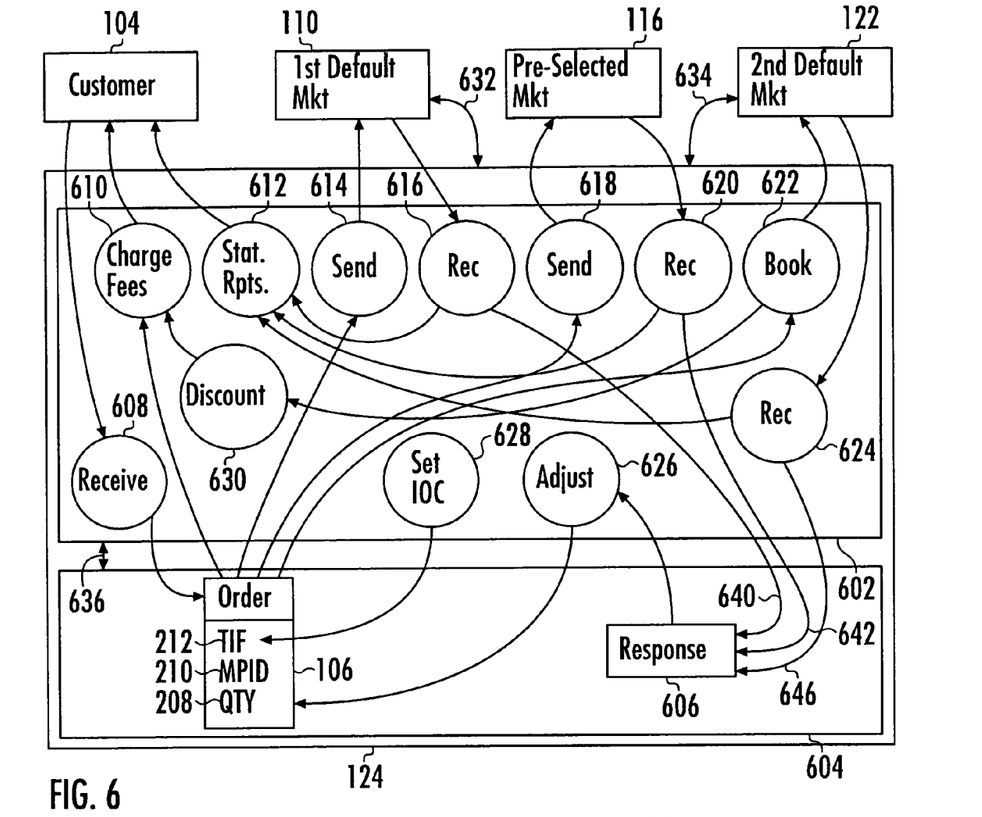
FIG. 6 is an overview of embodiments of a system of the invention.

Turning now to FIG. 6, another aspect of the invention is seen. One embodiment illustrated in FIG. 6 provides a broker-dealer system (124) for executing orders for securities. The embodiment of FIG. 6 includes a processor (602) programmed to receive (608) from a customer (104) an order (106) for a quantity (208) of securities to be bought or sold, the order having an MPID (210) optionally set to identify a pre-selected market (116). The embodiment further includes a processor (602) programmed to send (614) the order (106) to a first default market (110), where the order is partially filled (616), send (618) the order (106) to at least one pre-selected market (116), where the order (106) is partially filled (620), and book (622) the order in a second default market (122). The embodiment further includes memory (604) coupled (636) to the processor (602), the processor being further programmed to store (638) in the memory (604) the order (106) and programmed to store (640, 642, 646) responses (606) to the order.

Typical embodiments include a processor further programmed to return status reports (612) to customers (104) at various stages of order execution (616, 620, 624). Typical embodiments include the processor programmed to charge fees (610) to customers (104) for execution of orders. A further embodiment shown in FIG. 6 includes a processor (602) programmed to discount (630) fees charged (610) to customers (104) for orders booked (622) into a second default market (122). Booking (622) orders (106) into a second default market typically includes the order TIF (212) set to a value other than zero, that is, such bookings typically are non-IOC orders. Orders booked to second default markets therefore will eventually either be partially filled, completely filled, or time out. When such orders are booked, and when such orders eventually fill or time out, embodiments utilizing such bookings will include receiving responses (624) from the second default markets (122).

Also shown in FIG. 6 is an embodiment in which the order (106) includes a time-in-force (212). This embodiment further includes the processor (602) programmed to set (628) the time-in-force (212) to "IOC" before sending the order (106) to the at least one pre-selected market (116). In a further embodiment shown in FIG. 6, at least one of the default markets (110, 122) is connected through tight coupling (632, 634) to the broker-dealer system (124).

In typical embodiments of the system, as shown in FIG. 2, an order (106) includes a symbol (204) identifying securities to be bought or sold, a side (206) indicating whether the securities are to be bought or sold, and a quantity (208) of securities to be bought or sold according to the side. An order includes also an MPID (210) optionally set to a market identifier, a time-in-force (212) optionally set to a value greater than zero, and a price (214) optionally set to a value greater than zero. In various alternative embodiments of the system, the first default market (110) and the second default market (122) are the same market.

Figure 7:
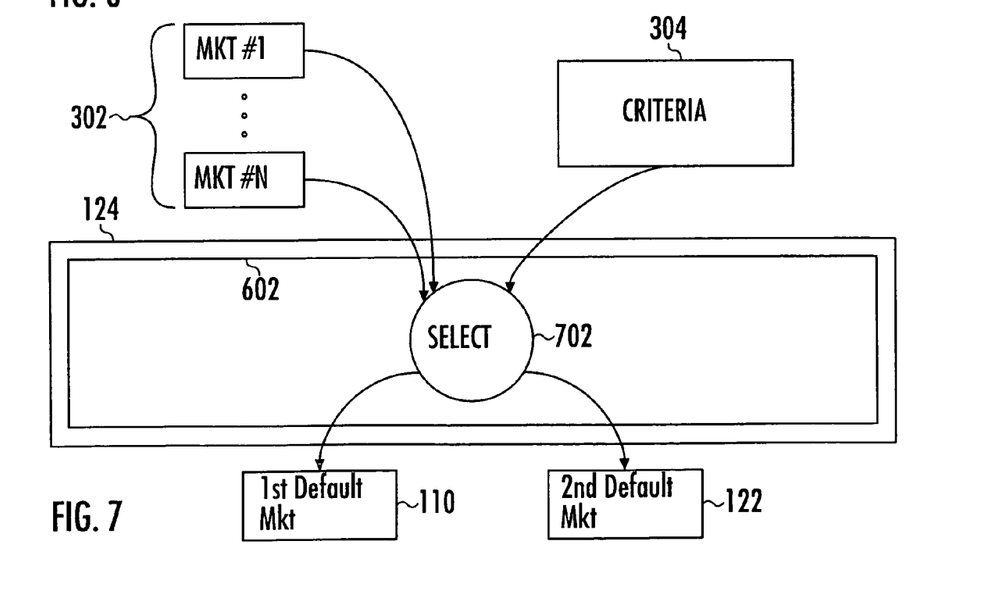
FIG. 7 illustrates a system for selecting default markets according to market selection criteria.

A still further embodiment, shown in FIG. 7, includes a processor (602) that is programmed to select (702), from among a multiplicity (302) of markets, the default markets (110, 122) dependent upon default market selection criteria (304). In many embodiments, market selection criteria include such factors as (1) transaction costs or access fee levels for execution of orders in markets, (2) response speed of markets, often referred to as 'latency,' the time typically elapsing between sending an order to a market and receiving a response from that market, and (3) liquidity, whether securities generally are available in a market. Various embodiments use various alternative default market selection criteria, all of which are well within the scope of the invention.

Figure 8:
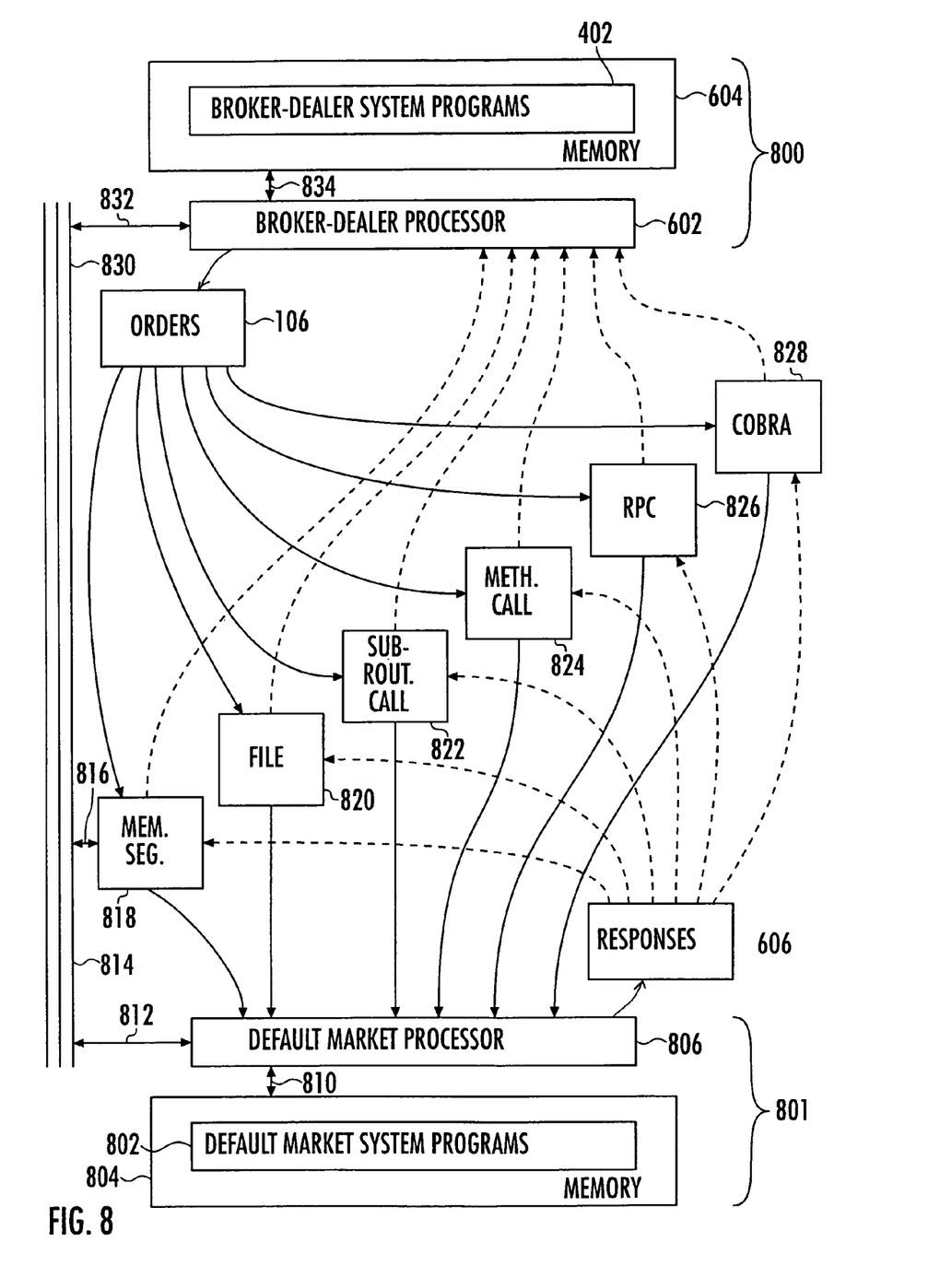
FIG. 8 illustrates system embodiments of close coupling.

In typical embodiments, shown in FIG. 8, tight coupling includes the capability of interprocess communications of orders (106) and responses (606) to orders through shared memory. Forms of shared memory include shared memory segments (818) accessed directly by processes running on processors. More specifically, in the illustrated embodiment, a broker-dealer program (402) operating on a broker-dealer processor (602) communicates orders and responses with a market program (802) operating on a market processor (806). More specifically, in the illustrated embodiment, the broker-dealer program (402) is installed in broker-dealer memory (604) coupled (834) to a broker-dealer processor (602) that executes the broker-dealer program, the program (402) installed in memory (604) and operating on the processor (602) comprising a broker-dealer system (800). In the illustrated embodiment, the market program (802) is installed in market system memory (804) coupled (810) to a market processor (806) that executes the market system program, the program (802) installed in memory (802) and operating on the processor (806) comprising a market system (801). The broker-dealer processor (602) and the market processor (806) in the illustrated embodiment are so closely coupled that they share the same memory bus (830), meaning that they are implemented under the same operating system in the same computer. In other embodiments, broker-dealer systems and tightly coupled market systems are installed on separate computers. In still further embodiments, tight coupling is implemented through shared files (820) on disk drives or through random access memory configured to emulate disk drives while operating faster than physical disk drives. Other forms of shared memory are useful to implement close coupling, and tight coupling through any form of shared memory is well within the invention.

In another embodiment illustrated in FIG. 8, tight coupling includes the capability of communications of orders and responses as parameters in subroutine calls (822). In the illustrated embodiment, a broker-dealer system (800) includes broker-dealer system programs (402) installed in broker-dealer system memory (604) and operating on a broker-dealer system processor (602) communicating orders (106) and responses (606) through subroutine calls (822) between the broker-dealer system and a market system (801) that includes market system programs (802) installed in market system memory (804) and operating on a market system processor (806). In some embodiments the market system (802, 804, 806) is installed and operated on the same computer system as the broker-dealer system (402, 602, 604).

Figure 8A:
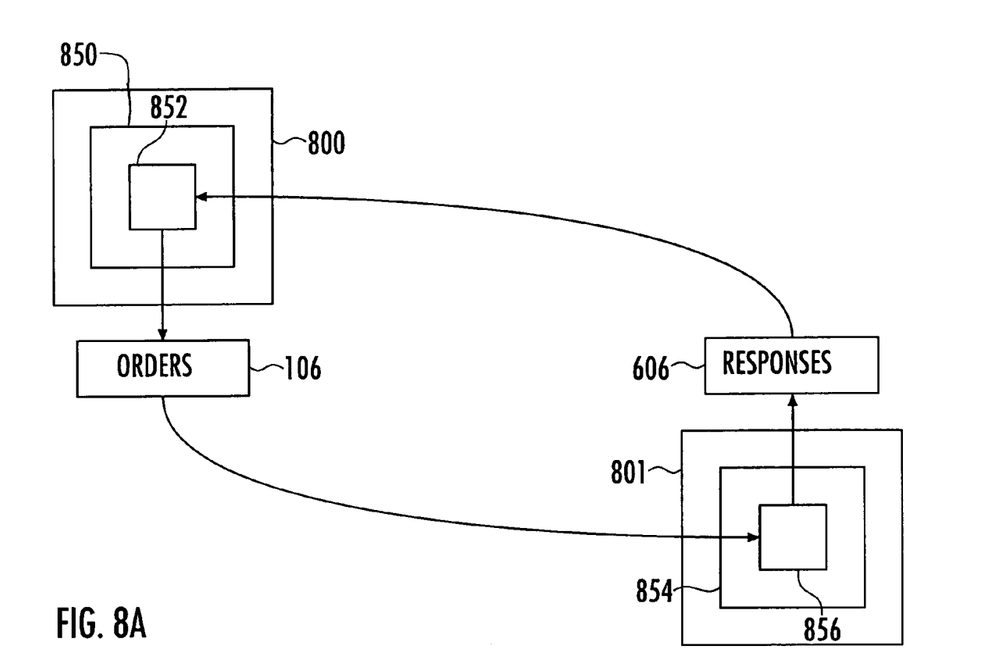
FIG. 8A illustrates close coupling through calls to member methods in class objects.

Also illustrated in FIG. 8 is an embodiment of tight coupling that includes the capability of communications of orders and responses to orders as parameters in calls to class object interface member methods (824). As shown in more detail in FIG. 8A, many such object-oriented embodiments include a broker-dealer system (800) programmed to send orders (106) and receive responses (606) from at least one member method (852) in at least one class object (850) in the broker-dealer system (800). Optionally such embodiments include also at least one market system (801) programmed to receive orders (106) and send responses (606) from at least one member method (856) in at least one class object (854) in the broker-dealer system (800).

Tight coupling, in embodiments using data communications to send and receive orders and responses between separate broker-dealer systems and market systems, typically includes the capability of communications through directly-connected or networked, dedicated or multipurpose, synchronous or asynchronous, parallel or serial, extremely high speed data communications ports and data communications lines. In this context, "separate" means that a broker-dealer system and a tightly coupled market system are not installed and operating on the same computer system to as to utilize memory bus connections to the same physical random access memory. The broker-dealer system and the market system in some embodiments are located in close proximity. In other embodiments, such systems are located remotely from one another.

Figure 9:
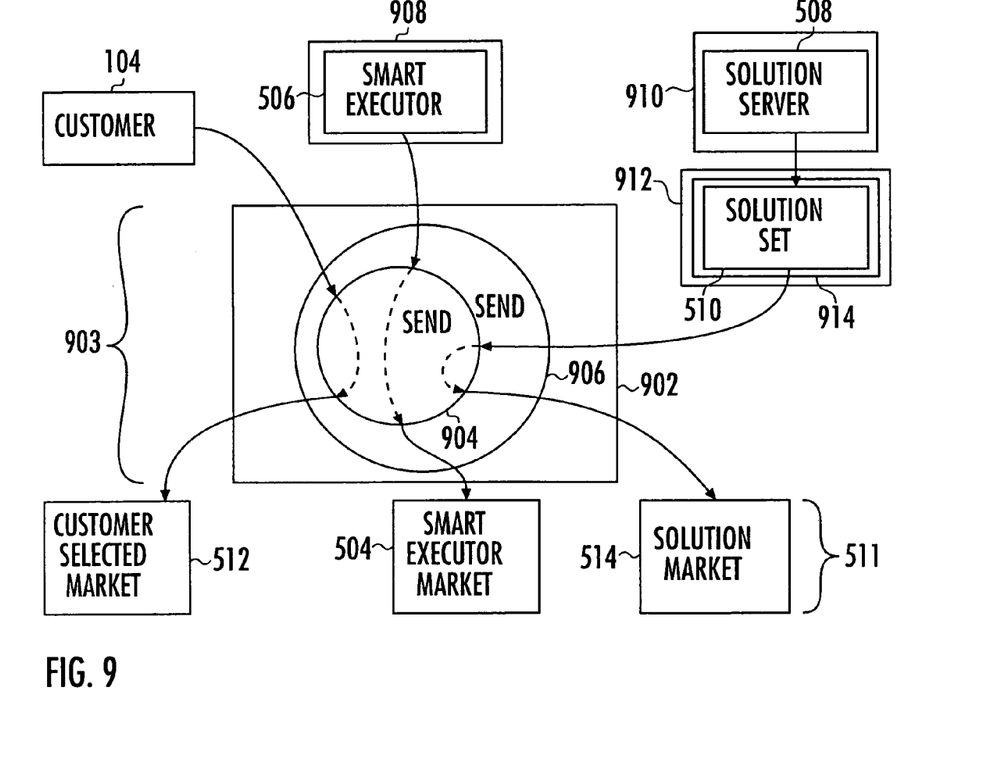
FIG. 9 illustrates system embodiments for sending orders to pre-selected markets.

In a further embodiment shown in FIG. 9, a broker-dealer processor (902) is programmed to send (906) orders to at least one pre-selected market (511). In one embodiment of the kind shown in FIG. 9, the processor, in sending orders to pre-selected markets (511), is further programmed to send (904) orders to a market (512) identified in an MPID and the market identified in the MPID is selected by the customer (104) before the order is received in the broker-dealer system.

In an alternative embodiment also shown in FIG. 9, the processor (902) is programmed to send (906) the order to at least one pre-selected market (511). In this embodiment, the processor is further programmed to send (904) the order to a market (504) selected by a smart executor (506). In the illustrated embodiment, the smart executor (506) is installed and running on at least one separate computer (908). In other embodiments, the smart executor (506) and the broker-dealer system (903) are installed and run on the same computer.

In an alternative embodiment also shown in FIG. 9, the processor (902) in a broker-dealer computer system (903) is programmed to send (906) the order to at least one pre-selected market (512, 504, 514). In this embodiment, the processor (902) is further programmed to send (904) the order to a market (514) selected dependent upon a solution set from a solution server (508). In the illustrated embodiment, the solution set is in computer memory (914) on a computer (912) separate from the broker-dealer processor (902) and separate from the computer (910) on which the solution server (508) is installed. In other embodiments, the solution set (510), the solution server (508) and the broker-dealer system (903) are all installed on the same computer.

What is claimed is:

1. A method of executing orders for securities in an automated broker-dealer system, the method comprising the steps of:
receiving from a customer an order for a quantity of securities to be bought or sold, the order having an MPID optionally identifying a pre-selected market;
sending the order to a first default market, wherein the order is partially filled;
after sending the order to the first default market, sending the order to at least one pre-selected market, wherein the order is partially filled; and
after sending the order to at least one pre-selected market, booking the order in a second default market.

2. The method of claim 1 wherein the order comprises:
a symbol identifying securities to be bought or sold,
a side indicating whether the securities are to be bought or sold,
a quantity of securities to be bought or sold according to the side,
an MPID optionally set to a market identifier,
a time-in-force optionally set to a value greater than zero,
and a price optionally set to a value greater than zero.

3. The method of claim 1 wherein the first default market and the second default market are the same market.

4. The method of claim 1 further comprising selecting, from among a multiplicity of markets, the default markets dependent upon default market selection criteria.

5. The method of claim 1 wherein at least one of the default markets is connected through tight coupling to the broker-dealer system.

6. The method of claim 5 wherein tight coupling comprises the capability of interprocess communications of orders and responses to orders through shared memory.

7. The method of claim 5 wherein tight coupling comprises the capability of communications of orders and responses to orders as parameters in subroutine calls.

8. The method of claim 5 wherein tight coupling comprises the capability of communications of orders and responses to orders as parameters in calls to class object interface member methods.

9. The method of claim 5 wherein tight coupling comprises the capability of communications of orders and responses to orders through directly-connected, dedicated, synchronous, parallel, extremely high speed data communications ports and data communications lines.

10. The method of claim 1 wherein the order comprises a time-in-force, the method further comprising setting the time-in-force to indicate an IOC order before sending the order to the at least one pre-selected market.

11. The method of claim 1 wherein sending the order to at least one pre-selected market further comprises sending the order to a market identified in the MPID, wherein the market identified in the MPID is selected by the customer before the order is received in the broker-dealer system.

12. The method of claim 1 wherein sending the order to at least one pre-selected market further comprises sending the order to a market selected by a smart executor.

13. The method of claim 1 wherein sending the order to at least one pre-selected market further comprises sending the order to a market selected dependent upon a solution set from a solution server.

14. The method of claim 1 wherein fees charged to customers for execution of orders are discounted for orders that are booked in the second default market.

15. The method of claim 1 wherein at least one of the default markets is an ECN.

16. The method of claim 1 wherein the default market is an ECN.

17. A method of executing orders for securities in an automated broker-dealer system, the method comprising the steps of:
receiving from a customer an order for a quantity of securities to be bought or sold;
sending the order as an IOC order to at least one pre-selected market; and
booking the order in a default market after said sending.

18. The method of claim 17 further comprising selecting, from among a multiplicity of markets, the default market dependent upon default market selection criteria.

19. The method of claim 17 wherein the default market is connected through tight coupling to the broker-dealer system.

20. The method of claim 17 wherein the order comprises a time-in-force, the method further comprising setting the time-in-force to indicate an IOC order before sending the order to the at least one pre-selected market.

21. The method of claim 17 wherein fees charged to customers for execution of orders are discounted for orders that are booked in the default market.

22. A system for executing orders for securities, the system comprising:
a processor programmed to:
receive from a customer an order for a quantity of securities to be bought or sold, the order having an MPID optionally set to identify a pre-selected market;
send the order to a first default market, wherein the order is partially filled;

after sending the order to the first default market, send the order to at least one pre-selected market, wherein the order is partially filled; and after sending the order to at least one pre-selected market, book the order in a second default market; and a memory coupled to the processor, the processor further programmed to store in the memory the order and responses to the order.

23. The system of claim 22 wherein the order comprises:
a symbol identifying securities to be bought or sold,
a side indicating whether the securities are to be bought or sold,
a quantity of securities to be bought or sold according to the side,
an MPID optionally set to a market identifier,
a time-in-force optionally set to a value greater than zero, and
a price optionally set to a value greater than zero.

24. The system of claim 22 wherein the first default market and the second default market are the same market.

25. The system of claim 22 wherein the processor is further programmed to select, from among a multiplicity of markets, the default markets dependent upon default market selection criteria.

26. The system of claim 22 wherein at least one of the default markets is connected through tight coupling to the broker-dealer system.

27. The system of claim 26 wherein tight coupling comprises the capability of interprocess communications of orders and responses to orders through shared memory.

28. The system of claim 26 wherein tight coupling comprises the capability of communications of orders and responses to orders as parameters in subroutine calls.

29. The system of claim 26 wherein tight coupling comprises the capability of communications of orders and responses to orders as parameters in calls to class object interface member methods.

30. The system of claim 26 wherein tight coupling comprises the capability of communications of orders and responses to orders through directly-connected, dedicated, synchronous, parallel, extremely high speed data communications ports and data communications lines.

31. The system of claim 22 wherein the order comprises a time-in-force and the processor is further programmed to set the time-in-force to indicate an IOC order before sending the order to the at least one pre-selected market.

32. The system of claim 22 wherein the processor programmed to send the order to at least one pre-selected market further comprises the processor programmed to send the order to a market identified in the MPID, wherein the market identified in the MPID is selected by the customer before the order is received in the broker-dealer system.

33. The system of claim 22 wherein the processor programmed to send the order to at least one pre-selected market further comprises the processor programmed to send the order to a market selected by a smart executor.

34. The system of claim 22 wherein the processor programmed to send the order to at least one pre-selected market further comprises the processor programmed to send the order to a market selected dependent upon a solution set from a solution server.

35. The system of claim 22 wherein the processor is further programmed charge fees to customers for execution of orders and to discount fees for orders that are booked in the second default market.

36. The system of claim 22 wherein at least one of the default markets is an ECN.

37. A system for executing orders for securities, the system comprising:
a processor programmed to:
receive from a customer an order for a quantity of securities to be bought or sold;
send the order as an IOC order to at least one pre-selected market; and
book the order in a second default market after said sending; and
a memory coupled to the processor, the processor further programmed to store in the memory the order and responses to the order.

38. The system of claim 37 wherein the processor is further programmed to select, from among a multiplicity of markets, the default market dependent upon default market selection criteria.

39. The system of claim 37 wherein the default market is connected through tight coupling to the broker-dealer system.

40. The system of claim 37 wherein the order comprises a time-in-force and the processor is further programmed to set the time-in-force to indicate an IOC order before sending the order to the at least one pre-selected market.

41. The system of claim 37 wherein the processor is further programmed charge fees to customers for execution of orders and to discount fees for orders that are booked in the default market.

42. The system of claim 37 wherein the default market is an ECN.

43. A method of executing orders for securities, the method comprising:
receiving from a customer an order that specifies a security, a quantity to be bought or sold, a selected market, and a greater-than-zero time-in-force;
submitting the order as an IOC order to a default market different from the selected market;
receiving an order response from the default market;
after receiving said order response from the default market, submitting any unfilled portion of the order as an IOC order to the selected market;
receiving an order response from the selected market; and
after receiving said order response from the selected market, submitting any still-unfilled portion of the order as an order with said greater-than-zero time-in-force to a second default market different from the selected market.

* * * * *